March 19, 1957 A. W. WENTZ 2,785,453
SEPARABLE FASTENER STRUCTURE
Filed June 11, 1952 2 Sheets-Sheet 1

INVENTOR.
ALAN W. WENTZ
BY Whittemore,
Hulbert & Belknap
ATTORNEYS

March 19, 1957  A. W. WENTZ  2,785,453
SEPARABLE FASTENER STRUCTURE
Filed June 11, 1952  2 Sheets-Sheet 2
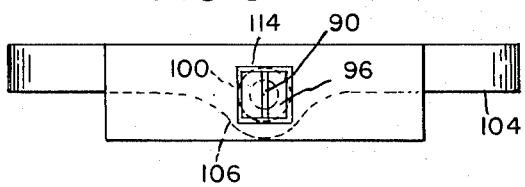
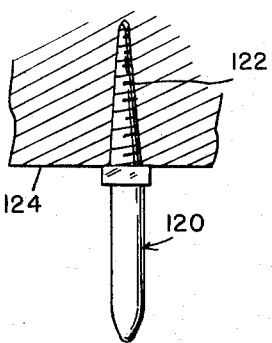
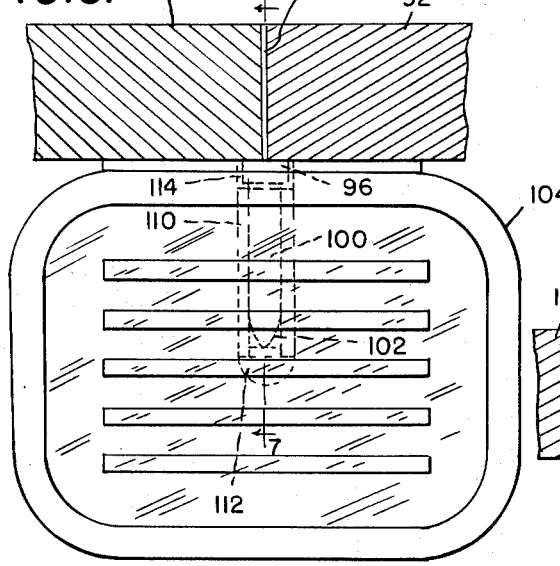
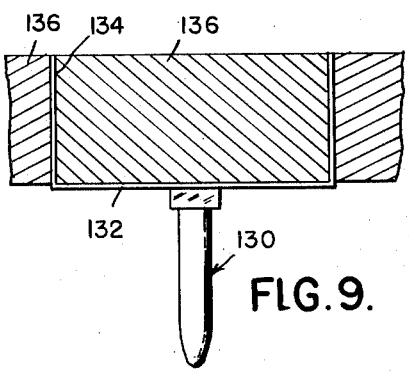
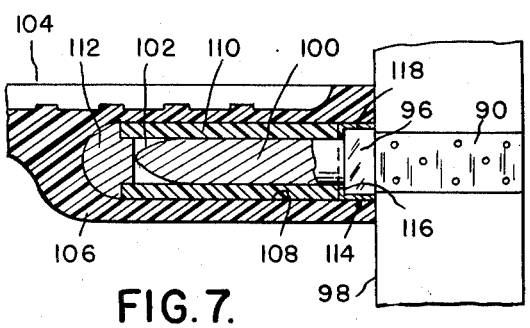
INVENTOR.
ALAN W. WENTZ
BY *Whittemore,*
*Hulbert & Belknap*
ATTORNEYS United States Patent Office 2,785,453
Patented Mar. 19, 1957

2,785,453

SEPARABLE FASTENER STRUCTURE

Alan W. Wentz, Birmingham, Mich.

Application June 11, 1952, Serial No. 292,965

5 Claims. (Cl. 24—217)

The present invention relates to separable fastener structure.

It is an object of the present invention to provide separable fastener structure comprising a first element having an open ended tubular portion formed of a substantially rigid elastomeric plastic material, and a second element having a part receivable in the tubular portion, the part of the second element receivable in the tubular portion being so shaped or dimensioned as to cause substantial distortion of the tubular portion of the first element upon entry thereinto to produce a strong frictional gripping of the second element by the first element.

It is a further object of the present invention to provide separable fastener structure characterized by its economy, its efficiency, its ability to perform in a satisfactory manner throughout a long useful life, and characterized further by its attractive appearance and its avoidance of unsightly projecting elements.

Other objects and features of the invention will become apparent as the description proceeds, especially when taken in conjunction with the accompanying drawings, wherein:

Figure 5 is a rear elevational view of a soap dish to which the separable fastener structure is adapted.

Figure 6 is a plan view of the soap dish with parts in section showing the fastener structure in position.

Figure 7 is a sectional view of the soap dish on the line 7—7, Figure 6.

Figure 8 is a section view showing one manner of supporting the male fastener element.

Figure 9 is a sectional view showing yet another manner of supporting the male fastener element.

Figure 1:
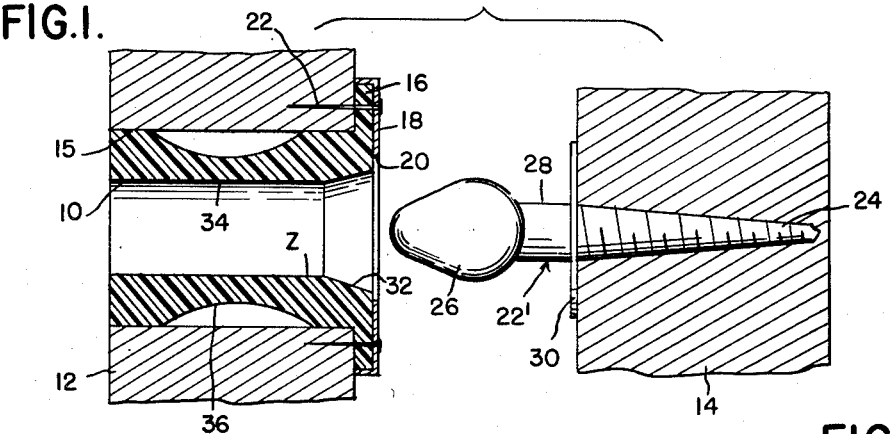
Figure 1 is an exploded sectional view through the fastener elements showing the parts in separated condition.

Referring now to the drawings, in Figure 1 there is illustrated separable fastener structure comprising a sleeve 10 formed of a suitable substantially rigid elastomeric plastic material. In this embodiment of the invention as in those subsequently described, the particular plastic is characterized by substantial rigidity so that it is strongly self-supporting in use. However, the plastic material is an elastomeric material and exhibits certain limited resilience. The material is relatively hard and preferably has a hardness of between 55 and 86 as indicated on a Shore durometer "A." In practice, excellent results have been obtained with vinyl plastics having the physical properties referred to above. It is appreciated of course that other plastics having equivalent properties may be employed instead of vinyl plastics and reference is made to vinyl plastics merely to suggest one satisfactory manner of carrying the invention to practice.

The structure illustrated in Figure 1 may be applied to widely different mechanism and the part 12 which carries the sleeve 10 may be a shelf of a cabinet, a storm window or window sash, or any element adapted to be connected to the cooperating part 14. In the embodiment of the invention illustrated the part 12 is formed with a cylindrical opening 15 therethrough and the sleeve 10 is located within the opening. In order to retain the sleeve within the opening it is provided with a radially extending flange 16 with which is associated a cover plate 18 having a central opening 20 exposing an open end of the tubular sleeve 10. The cover plate 16 may be retained in position by suitable means such for example as nails 22, or the like.

Associated with the sleeve 10 is the male fastener element 22' which is herein illustrated as having a threaded screw shank 24 adapted to be retained in the member 14. The element 22' includes an enlarged head 26 connected to the screw shank 24 by a reduced portion 28, and the element is illustrated as comprising a radially extending flange 30.

While in the simplest form of the invention the tubular sleeve 10 may be of smooth internal and external cylindrical configuration and the head 26 may be spherical or partly spherical, certain modifications of the basic structure improve the operation of the fastener elements. Thus for example, it is preferred to provide an outwardly flared portion 32 at the entrance end of the sleeve 10 to facilitate entry of the head 26 thereinto. In similar manner it is preferred to form the head 26 with substantially the configuration shown, thus having a tapered front end which facilitates entry of the head into the tubular sleeve 10.

In order to insure tight frictional gripping between the sleeve and the head, the maximum cross-sectional area of the head is slightly larger than the internal cross-sectional area of the sleeve 10, thus requiring substantial distortion of the sleeve to permit entry of the head therein.

In Figure 1 the sleeve 10 is illustrated as having an intermediate wall portion at 34 which is of reduced thickness, this being provided by an annular external groove 36 formed around the sleeve 10. It will be appreciated that when the head 26 enters the sleeve a substantial force will be required to compress the portion of the plastic tube at the zone indicated by the letter Z but that when the largest portion of the head has passed this zone, the relatively thin wall portion 34 may be distorted outwardly with the application of less force.

Figure 2:
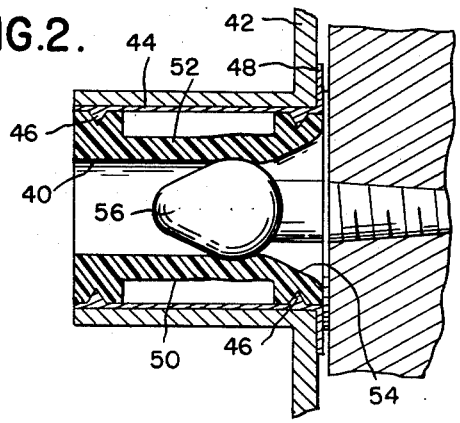
Figure 2 is a transverse sectional view through a modified embodiment of the present invention showing the fastener elements in cooperating relationship.

Referring now to Figure 2 there is illustrated a somewhat different embodiment of the invention. In this case the sleeve 40 is intended for association with a metal part 42 which may for example be a metal medicine cabinet. In this case the plastic sleeve 40 has associated therewith a metal sleeve 44, the two sleeves being connected by suitable means such for example as tangs 46 struck inwardly from the metal sleeve 44 into the material of the plastic sleeve 40. The metal sleeve 44 at one end includes an outwardly extending radial flange 48 which may be secured to the front surface of the part 42 by welding or the like. With this relationship the plastic sleeve 40 is firmly and permanently mounted in the part 42.

In this embodiment of the invention the central portion of the sleeve 40 is provided with an external annular groove 50, thus providing an intermediate wall portion 52 of reduced thickness. Again, the entrance end to the plastic tube 40 is flared as indicated at 54.

The head 56 of the male fastener element may be identical with that disclosed in Figure 1.

Figure 3:
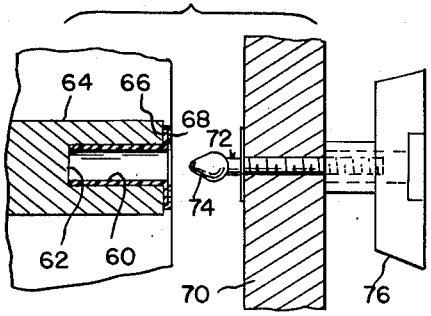
Figure 3 is a sectional view showing the invention applied to a cupboard door.

Referring now to Figure 3 there is illustrated an arrangement in which the plastic sleeve 60 is mounted in a recess 62 provided in a cupboard shelf 64. The sleeve 60 has a radially extending flange 66 at one end and overlying this flange is an annular retainer 68. The cupboard door 70 is provided with the male fastener element 72 having an enlarged head 74. In this embodiment of the invention the element 72 extends completely through the door and serves as means for mounting the door pull indicated generally at 76.

Figure 4:
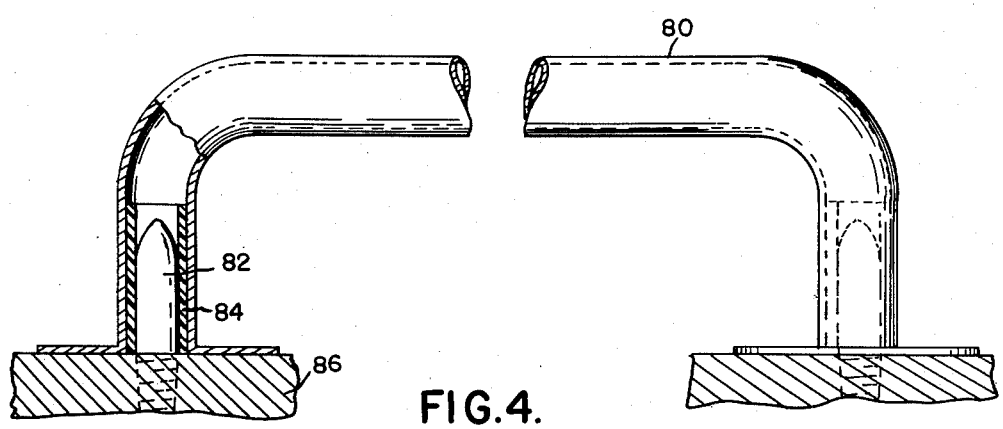
Figure 4 is an elevational view partly in section showing the invention applied to support a towel rack.

Referring now to Figure 4 there is illustrated the application of the present invention to supporting a towel rack 80. In this case the male fastener elements 82 include elongated cylindrical portions tapering at their outer ends as compared to the enlarged heads in the embodiments of the invention previously described. The ends of the tubular towel rack 80 are provided with elastomeric plastic sleeves 84 dimensioned to cause distortion when the fastener elements 82 are inserted therein. It will be appreciated of course that if desired the relationship of parts could be reversed and the plastic sleeve 84 mounted in a suitable recess in the wall structure 86, in which case the male fastener elements 82 would extend outwardly beyond the ends of the towel rack 80.

Referring now to Figures 5-7 the invention is illustrated as applied to a soap dish. In this case it is desired to support the soap dish on a single separable fastener device and accordingly, means are required to support the soap dish against rotation.

The male fastener element in this case is illustrated as provided with a flat blade-like portion 90 which is adapted to be inserted between a pair of tiles 92 and 94 on a tiled surface. The fastener element includes a portion 96 of non-circular cross-section and conveniently the portion 96 may be of square or rectangular cross-section. Outwardly of the wall 98 from the non-circular section 96 the fastener element includes a longitudinally extending cylindrical portion 100 which terminates at its outer end in a tapered section 102 to facilitate in guiding the portion 100 into the sleeve.

The soap dish is indicated generally at 104 and is provided with a downwardly extending boss 106 provided with an elongated cylindrical recess 108. Located within the recess 108 is the elastomeric plastic sleeve 110 which in this instance is illustrated as of uniform cylindrical shape. The inner end of the sleeve 110 may if desired be closed by a cap 112.

Located in the recess 108 and adjacent the outer end thereof is a seat member 114 which may conveniently be made of metal and which has an inner wall 116 adapted to overlie the end of the sleeve 110 and to thereby retain the sleeve in the recess 108. The seat member 114 has side walls 118 of suitable non-circular cross-section which in the illustrated embodiment of the invention are square and cooperate with the enlarged square portion 96 of the male fastener element. With the parts assembled as illustrated in Figure 7, the square portion 96 of the male fastener element is seated within the seat member 114 and is retained thereby against rotation.

In Figure 8 there is illustrated a modified form of fastener element 120 which may be identical with that shown in Figures 5-7 except that it is provided with a tapered screw end 122 by means of which the fastener element may be mounted in a wall 124.

In Figure 9 there is illustrated a somewhat different embodiment of the invention in which the male fastener element 130 is provided with a supporting strap 132 terminating in blade portions 134 adapted to be inserted between tiles 136. In this case the fastener element 130 is strongly supported by insertion of the blades 134 at widely separated points between adjacent tiles 136.

Basically, the present invention is characterized by the establishment of tight frictional engagement between the male and female elements, the female element being in the form of a distortable though substantially rigid elastomeric plastic material having sufficient hardness to give it long life and at the same time to cooperate with the male fastener element. Preferably, the male fastener element is formed of metal and may have a headed end portion or may be of generally uniform cylindrical shape throughout its length. In any case the male and female elements are designed relative to each other so as to require substantial distortion of the tubular element by insertion of the male element thereinto which brings about the strong frictional resistance between the two. In the preferred embodiment of the invention the cross-sectional area of the male element is somewhat greater than the internal cross-sectional area of the tubular element whereby the distortion of the tubular element comprises actual stretching of the material at the inner surface. Alternatively, the parts may be shaped relative to each other so as to require substantial distortion without actual stretching. Thus, for example, the tubular plastic element may have associated therewith a male element of non-circular cross-section such for example as of oval, whose cross-sectional area may be equal to or somewhat less than the internal cross-sectional area of the sleeve. In this case the distortion of the material of the tubular sleeve involves merely a change in shape and not an actual stretching of its internal surface.

The drawings and the foregoing specification constitute a description of the improved separable fastener structure in such full, clear, concise and exact terms as to enable any person skilled in the art to practice the invention, the scope of which is indicated by the appended claims.

What I claim as my invention is:

1. Separable non-rotatable mounting structure comprising a body having an elongated cylindrical recess therein, a tubular sleeve of a substantially rigid elastomeric plastic material in said recess, a seat member of non-circular cross-section in said recess, and an elongated element removably received in said recess comprising a first portion of circular cross-section having a cross-sectional area exceeding the internal cross-sectional area of said sleeve, and a second portion of non-circular cross-section shaped to seat within said seat member.

2. Structure as defined in claim 1 in which said seat member is located at the outer end of said recess and has an apertured inner wall engaging the outer end of said sleeve to retain said sleeve in said recess.

3. In separable fastener structure, a female socket member having a cylindrical open-ended recess therein, a sleeve formed of a substantially rigid elastomeric plastic material having limited resilience received in said recess and extending inwardly from the open end thereof, said sleeve having a cylindrical inner surface flared outwardly at the end adjacent the open end of said recess and having an external annular groove spaced inwardly from its aforesaid end defining a wall section of said sleeve of reduced thickness which is spaced radially inwardly from the wall of said recess, and a cooperating male member having an enlarged head of generally spherical shape receivable in said sleeve and adapted to extend into the portion of said sleeve defined by the wall section of reduced thickness, the maximum cross-sectional area of said head being greater than the cross-sectional area of the cylindrical inner surface of said sleeve to effect a tight frictional engagement therewith.

4. In separable fastener structure, a female socket member having a cylindrical open-ended recess therein, a sleeve formed of a resilient material received in said recess and extending inwardly from the open end thereof, said sleeve having a cylindrical inner surface flared outwardly at the end adjacent the open end of said recess and having an external annular groove spaced inwardly from its aforesaid end defining a wall section of said sleeve of reduced thickness which is spaced radially inwardly from the wall of said recess, and a cooperating male member having an enlarged head of generally spherical shape receivable in said sleeve and adapted to extend into the portion of said sleeve defined by the wall section of reduced thickness, the maximum cross-sectional area of said head being greater than the cross-sectional area of the cylindrical inner surface of said sleeve to effect a tight frictional engagement therewith.

5. In separable fastener structure, a female socket member having a cylindrical open-ended recess therein, a sleeve formed of substantially rigid elastomeric plastic material having limited resilience received in said recess and extending inwardly from the open end thereof, said sleeve having a cylindrical inner surface flared outwardly at the end adjacent the open end of said recess, and a cooperating male member having an enlarged head of generally spherical shape receivable in said sleeve, the maximum cross-sectional area of said head being greater than the cross-sectional area of the cylindrical inner surface of said sleeve to effect a tight frictional engagement therewith, said sleeve being formed of a vinyl plastic and having a hardness of from 55 to 86 based on Shore Durometer "A," said sleeve having an external annular groove spaced inwardly from the end adjacent the open end of said recess defining a wall section of reduced thickness which is spaced radially inwardly from the wall of said recess, and said head being adapted to extend into the portion of said sleeve defined by the wall section of reduced thickness.

References Cited in the file of this patent

UNITED STATES PATENTS

| | | |
|---|---|---|
| 300,451 | Downham | June 17, 1884 |
| 321,389 | Schirmer | June 30, 1885 |
| 444,338 | Dodge | Jan. 6, 1891 |
| 665,901 | Hampton | Jan. 15, 1901 |
| 2,088,955 | Hamill | Aug. 3, 1937 |
| 2,172,125 | Hamill | Sept. 5, 1939 |
| 2,379,529 | Kennedy | July 3, 1945 |
| 2,548,004 | Duefrene | Apr. 10, 1951 |

FOREIGN PATENTS

| | | |
|---|---|---|
| 105,106 | Australia | Sept. 7, 1938 |